United States Patent
Park (10) Patent No.: US 11,011,950 B2
(45) Date of Patent: May 18, 2021

(54) MOTOR THAT INCLUDES A YOKE HAVING A FLANGE PORTION

(71) Applicant: LG INNOTEK CO., LTD., Seoul (KR)

(72) Inventor: Young Dae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 237 days.

(21) Appl. No.: 16/308,347

(22) PCT Filed: Jun. 9, 2017

(86) PCT No.: PCT/KR2017/005994
§ 371 (c)(1),
(2) Date: Dec. 7, 2018

(87) PCT Pub. No.: WO2017/213450
PCT Pub. Date: Dec. 14, 2017

(65) Prior Publication Data
US 2020/0313477 A1    Oct. 1, 2020

(30) Foreign Application Priority Data

Jun. 9, 2016 (KR) .......................... 10-2016-0071822

(51) Int. Cl.
*H02K 1/27* (2006.01)
*H02K 11/21* (2016.01)

(52) U.S. Cl.
CPC ............ *H02K 1/274* (2013.01); *H02K 11/21* (2016.01)

(58) Field of Classification Search
CPC .......... H02K 1/274; H02K 1/145; H02K 1/28; H02K 2201/00; H02K 11/21; H02K 7/081

USPC ..... 310/40 R, 257, 156.12, 156.13, 83, 75 R
See application file for complete search history.

(56) References Cited

U.S. PATENT DOCUMENTS

| | | | |
|---|---|---|---|
| 4,641,422 A * | 2/1987 | Weaver | H02K 1/2733 29/598 |
| 5,500,994 A * | 3/1996 | Itaya | H02K 1/2733 264/272.2 |
| 5,602,681 A | 2/1997 | Nakayama et al. | |
| 6,013,961 A | 1/2000 | Sakamaki et al. | |
| 6,768,242 B1 * | 7/2004 | Suzuki | H02K 1/278 310/216.074 |

(Continued)

FOREIGN PATENT DOCUMENTS

| | | |
|---|---|---|
| JP | H07-264818 | 10/1995 |
| JP | H07-336939 | 12/1995 |
| JP | H11-266568 | 9/1999 |

(Continued)

OTHER PUBLICATIONS

Chinese Office Action dated Apr. 26, 2020 issued in Application No. 201780036065.3.

(Continued)

*Primary Examiner* — Michael Andrews
(74) *Attorney, Agent, or Firm* — KED & Associates LLP (57) ABSTRACT

The present invention may provide a rotor comprising: a rotating shaft; a yoke surrounding the rotating shaft; and a magnet coupling to the outer side of the yoke, wherein the yoke comprises a flange part, wherein the flange part comprises a groove, and the magnet comprises a protrusion that is inserted in the groove.

8 Claims, 10 Drawing Sheets

(56) References Cited

U.S. PATENT DOCUMENTS 7,579,743 B2 * 8/2009 Komagata ............ H02K 1/2733
310/156.38
2001/0048261 A1 * 12/2001 Kojima .................... H02K 1/30
310/156.13

FOREIGN PATENT DOCUMENTS

| JP | 2007-060801 | 3/2007 |
| JP | 2009-060733 | 3/2009 |
| WO | WO 2015/168858 | 11/2015 |

OTHER PUBLICATIONS

International Search Report (with English Translation) and Written Opinion dated Aug. 18, 2017 issued in Application No. PCT/KR2017/005994.

* cited by examiner

MOTOR THAT INCLUDES A YOKE HAVING A FLANGE PORTION

CROSS-REFERENCE TO RELATED PATENT APPLICATIONS

This application is a U.S. National Stage Application under 35 U.S.C. § 371 of PCT Application No. PCT/KR2017/005994, filed Jun. 9, 2017, which claims priority to Korean Patent Application No. 10-2016-0071822, filed Jun. 9, 2016, whose entire disclosures are hereby incorporated by reference.

TECHNICAL FIELD

Embodiments relate to a motor including the same.

BACKGROUND ART

An actuator is a device for moving an object. The actuator may include a motor. The motor includes a rotor which rotates. The rotor may be connected to a rotating shaft, and a screw thread may be formed on the rotating shaft. A moving portion connected to the object is combined with the rotating shaft by using a screw. When the rotating shaft rotates, the moving portion linearly reciprocates along the rotating shaft and the object moves in connection therewith.

Here, since the screw thread is formed on the rotating shaft, it is impossible to directly combine the rotor with the rotating shaft. Accordingly, the rotor may include a yoke which surrounds an area of the rotating shaft where the screw thread is formed, with a certain distance therefrom.

However, aluminum is used for the yoke due to a light weight and processability, and problems as below are present.

First, there is a problem that manufacturing costs are increased. This is because aluminum is more expensive than a general metal material. Also, it is difficult to use press working, which has high productivity, in a method of manufacturing a yoke formed of aluminum.

Second, when an anaerobic adhesive is used, a problem that a combinational force is significantly decreased due to properties of material is present. Accordingly, a problem that an additional member for preventing a slip with a magnet combined with an outer circumferential surface of the yoke should be added is present.

DISCLOSURE

Technical Problem

The present invention is directed to providing a rotor which is capable of being manufactured through press working and includes a yoke increasing a combinational force with a magnet, a motor, and an actuator including the same.

Aspects of an embodiment are not limited to the above-stated aspect and unstated other aspects can be clearly understood by those skilled in the art from the following description.

Technical Solution

One aspect of the present invention provides a rotor including a rotating shaft, a yoke which surrounds the rotating shaft, and a magnet combined with an outside of the yoke. Here, the yoke includes a flange portion. The flange portion includes a groove, and the magnet includes a protrusion which is inserted in the groove.

The yoke may include a body portion disposed to be spaced apart from the rotating shaft, a combination portion which is disposed on any one side of the body portion and on which the rotating shaft is pressed and fits thereon, and the flange portion disposed on the other side of the body portion.

The groove may have a shape obtained by incising a part of the flange portion.

An outer diameter of the flange portion may be smaller than an outer diameter of the magnet.

The magnet may include a step portion formed on an inner circumferential surface thereof on which the flange portion is mounted.

The protrusion may protrude from the step portion.

A shortest distance from a fore end of the protrusion to a center of the magnet may be formed to be greater than an inner diameter of the magnet.

An end of the protrusion may be a curved surface.

The magnet may include a first inner circumferential surface and a second inner circumferential surface. Here, a diameter of the second inner circumferential surface may be greater than a diameter of the first inner circumferential surface, and the flange portion may come into contact with the second inner circumferential surface.

The step portion may be disposed between the first inner circumferential surface and the second inner circumferential surface.

An inner circumferential surface of the protrusion may be disposed to be flush with the first inner circumferential surface to be successive thereto.

An outer diameter of the flange portion may be greater than an inner diameter of the first inner circumferential surface and may be equal to or smaller than the second inner circumferential surface.

Another aspect of the present invention provides a rotating shaft, a yoke which surrounds the rotating shaft, and a magnet combined with an outside of the yoke. Here, the magnet includes a step portion formed on an end thereof, and a protrusion of the step portion may protrude.

The yoke may include a flange portion, and the flange portion may include a groove in which the protrusion is inserted.

Another aspect of the present invention provides a rotor including a rotating shaft, a yoke which surrounds the rotating shaft, and a magnet combined with an outside of the yoke. Here, the yoke includes a flange portion, and the flange portion includes a groove.

The magnet may include a step portion formed at an end thereof, and the step portion may include a protrusion which is inserted into the groove.

Another aspect of the present invention provides a motor including a rotor and a stator disposed outside the rotor. Here, the rotor includes a rotating shaft, a yoke which surrounds the rotating shaft, and a magnet combined with an outside of the yoke. The yoke includes a flange portion. The flange portion includes a groove, and the magnet includes a protrusion which is inserted into the groove.

Another aspect of the present invention provides an actuator including a motor, a moving portion which moves along a rotating shaft of the motor, and a control portion which includes a sensor sensing a position of the moving portion. Here, the motor includes a rotor. The rotor includes a rotating shaft, a yoke which surrounds the rotating shaft, and a magnet combined with an outside of the yoke. The yoke includes a flange portion. The flange portion includes a groove, and the magnet includes a protrusion which is inserted into the groove.

Advantageous Effects

According to an embodiment, an advantageous effect of increasing a combinational force between a yoke and a magnet by using a groove at a flange portion of the yoke and a protrusion formed at the magnet is provided.

According to an embodiment, a groove is formed at a flange portion of a yoke and correspondingly, a protrusion is formed at only an end of a magnet such that an advantageous effect of increasing productivity by simplifying a combination configuration is provided.

According to an embodiment, a step portion on which a flange portion of a yoke is mounted is formed at an end of a magnet and a protrusion is formed at the end such that advantageous effects of simplifying a combinational configuration and increasing a combinational force between the yoke and the magnet are provided.

According to an embodiment, since it is possible to use press working such as a deep drawing method in manufacturing a yoke including a flange portion, an advantageous effect of significantly increasing productivity is provided.

According to an embodiment, since it is possible to use a general metal material in manufacturing a yoke, an advantageous effect of reducing manufacturing costs is provided.

According to an embodiment, an advantageous effect of reducing a weight of a product by using a flange portion having a relatively small volume in an entire yoke in combining the yoke with a magnet is provided.

According to an embodiment, since a groove is formed by incising a part of a flange portion, an advantageous effect of preventing a manufacturing process from being complicated by processing the groove is provided.

MODES OF THE INVENTION

Hereinafter, exemplary embodiments of the present invention will be described in detail with reference to the attached drawings. The purpose, particular advantages, and novel features of the present invention will be more clearly understood from the following detailed description and exemplary embodiments related to the attached drawings. Also, the terms used in the specification and the claims should not be limited to general or lexical meanings and should be interpreted as meanings and concepts coinciding with the technical concept of the present invention on the basis of a principle in which the inventor can appropriately define the concept of the terms to describe the invention in the best manner. Also, a detailed description on well-known related art that may unnecessarily obscure the essential of the present invention will be omitted.

Figure 1:
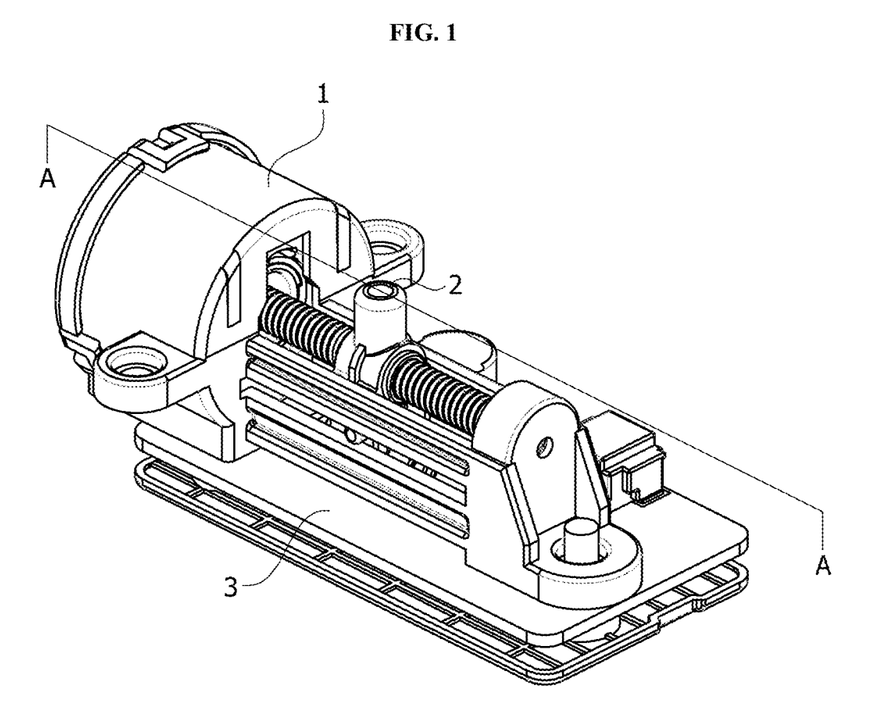
FIG. 1 is a view of an actuator.
Figure 2:
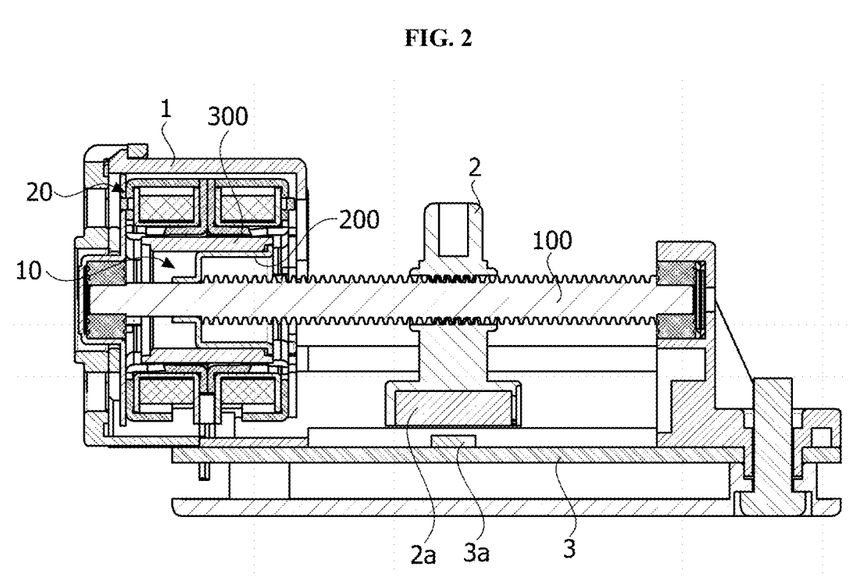
FIG. 2 is a cross-sectional view of the actuator taken along a line A-A of FIG. 1.

FIG. 1 is a view of an actuator according to an embodiment, and FIG. 2 is a cross-sectional view of the actuator taken along a line A-A of FIG. 1.

The actuator according to the embodiment may include a motor 1, a moving portion 2, and a sensor portion 3.

The motor 1 may include a rotor 10 and a stator 20.

The stator 20 may be included outside the rotor 10. The rotor 10 rotates due to an electrical interaction with the stator 20.

The rotor 10 may include a rotating shaft 100, a yoke 200, and a magnet 300. A screw thread may be formed on an outer circumferential surface of the rotating shaft 100. Both ends of the rotating shaft 100 may be supported by bearings. The bearings may be included in a bracket. The yoke 200 is combined with the rotating shaft 100. The yoke 200 combines the rotating shaft 100 with the magnet 300. The magnet 300 has a ring shape. Also, the magnet 300 may be combined with an outer circumferential surface of the yoke 200.

The stator 20 may be disposed outside the rotor 10. A coil may be wound on the stator 20. The coil wound on the stator 20 causes an electrical interaction with the magnet 300 and induces the rotor 10 to rotate.

The moving portion 2 may be combined with the rotating shaft 100 of the rotor 10 by using a screw. Accordingly, when the rotating shaft 100 rotates, the moving portion 2 linearly moves along the rotating shaft 100. The moving portion 2 may be supported by the bracket to be linearly movable. Also, the moving portion 2 may be connected to an apparatus of an object. Here, the object may be a headlamp mounted on a vehicle. In detail, the moving portion 2 may be directly connected to a reflector of the headlamp or may be indirectly connected to a frame or the reflector of the headlamp through a connecting member such as a link. As the moving portion 2 linearly reciprocates, the headlamp may be swiveled and leveled so as to change an emission direction of the lamp.

The moving portion 2 may include a sensor magnet 2a at a bottom. The sensor magnet 2a may be formed such that N polarity and S polarity are divided in an axial direction of the rotating shaft 100.

A control portion 3 controls driving of the motor 1. Also, the control portion 3 may include a sensor 3a which senses a change in magnetic flux caused by the sensor magnet 2a. The sensor 3a may be a hall sensor which converts the change in magnetic flux into a voltage through a hall effect. The sensor 3a may be disposed below the sensor magnet 2a to face the sensor magnet 2a. When the moving portion 2 moves over the sensor 3a, the sensor 3a senses a change in magnetic flux and determines a position of the moving portion 2.

Figure 3:
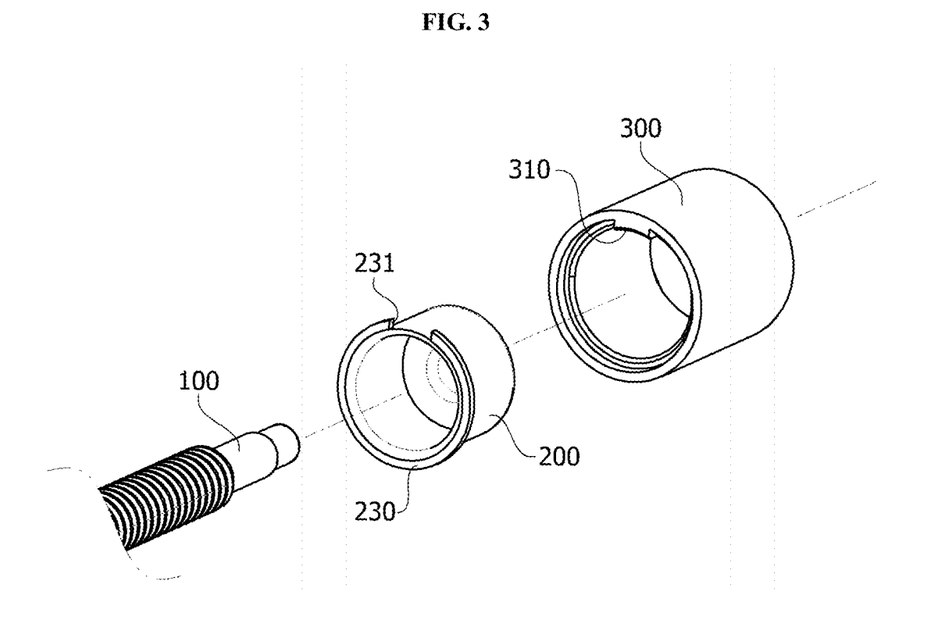
FIG. 3 is an exploded view illustrating a rotor.
Figure 4:
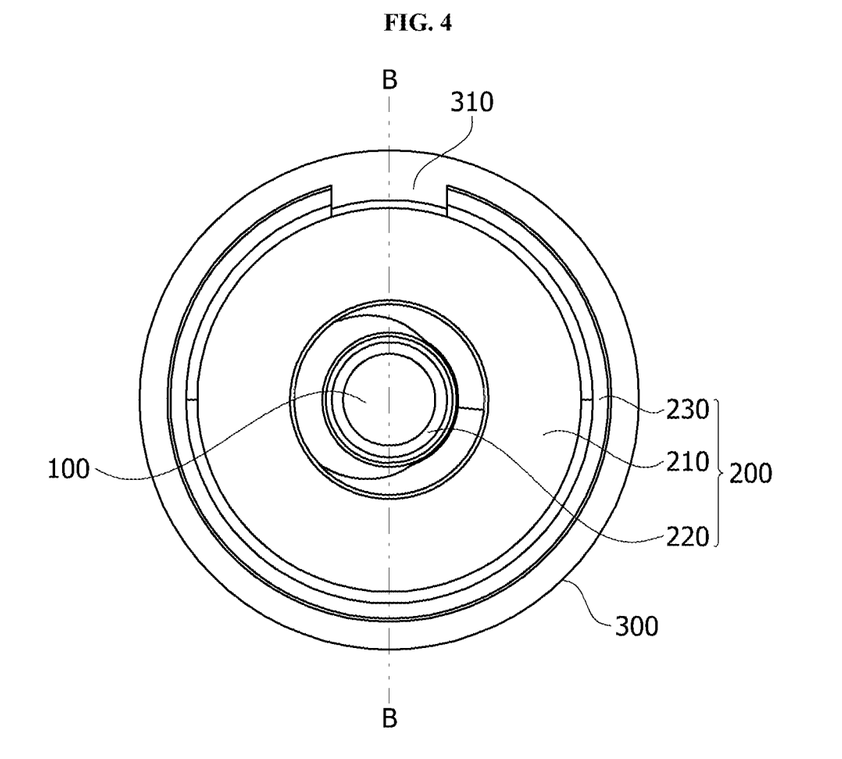
FIG. 4 is a front view of the rotor.
Figure 5:
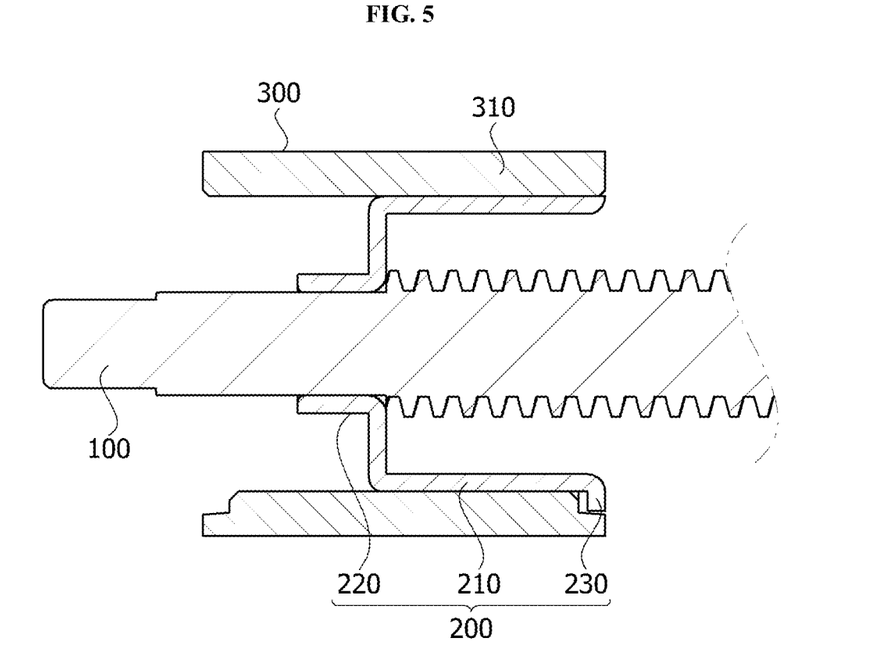
FIG. 5 is a cross-sectional view of the rotor taken along a line B-B of FIG. 4.

FIG. 3 is an exploded view illustrating the rotor, FIG. 4 is a front view of the rotor, and FIG. 5 is a cross-sectional view of the rotor taken along a line B-B of FIG. 4.

Referring to FIGS. 3 to 5, in the rotor 10, the yoke 200 is combined with an outside of the rotating shaft 100. Also, the magnet 300 is combined with an outside of the yoke 200. The rotating shaft 100 is pressed and fits on an inner circumferential surface of the yoke 200, and the magnet 300 is pressed and fits on the outer circumferential surface of the yoke 200. Here, a protrusion 310 of the magnet 300 is inserted into groove 231 of the yoke 200. As the protrusion 310 is inserted into the groove 231, a combinational force between the yoke 200 and the sensor magnet 2a greatly increases. Particularly, since the groove 231 and the protrusion 310 mutually restrict each other in a rotational direction, the magnet 300 may be prevented from slipping on the yoke 200.

Figure 6:
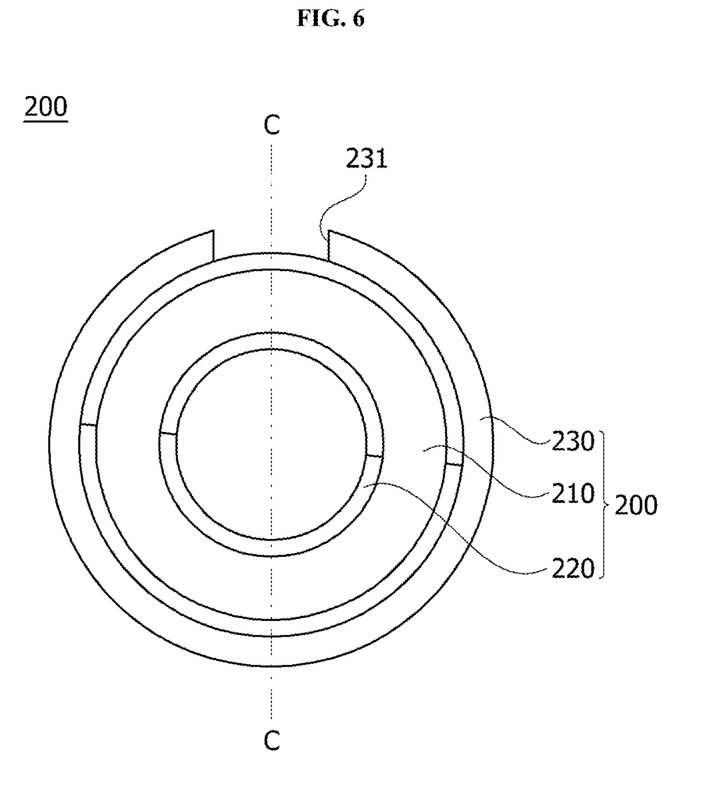
FIG. 6 is a view illustrating a yoke.
Figure 7:
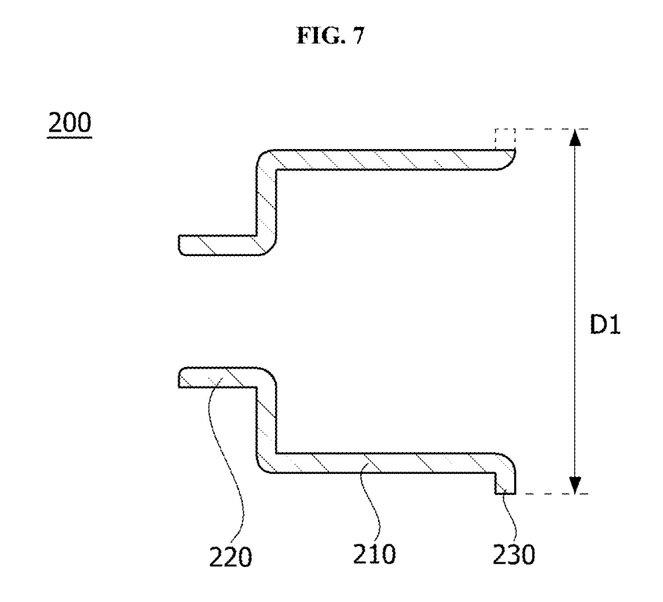
FIG. 7 is a cross-sectional view of the yoke taken along a line C-C of FIG. 5.

FIG. 6 is a view illustrating the yoke, and FIG. 7 is a cross-sectional view of the yoke taken along a line C-C of FIG. 5.

Referring to FIGS. 6 and 7, the yoke 200 may include a body portion 210, a combination portion 220, and a flange portion 230. Although the body portion 210, the combination portion 220, and the flange portion 230 have been described while being classified according to shapes and functional properties thereof, they may be mutually connected as one means manufactured through a deep drawing process and a bending process.

The body portion 210 has a cylindrical shape. The magnet 300 fits on an outer circumferential surface of the body portion 210. The body portion 210 is located while being spaced apart from the rotating shaft 100 located thereinside. This is because the screw thread is formed on the outer circumferential surface of the rotating shaft 100.

The combination portion 220 is formed on any one side of the body portion 210. The combination portion 220 has an inner diameter smaller than the body portion 210 such that the rotating shaft 100 is pressed and fits thereon. The combination portion 220 is combined with an end of the rotating shaft 100 on which the screw thread is not formed.

The flange portion 230 is formed on the other side of the body portion 210. The flange portion 230 includes the groove 231. The groove 231 may have a shape formed by incising a part of the flange portion 230. Accordingly, the groove 231 is processed through a simple process. Also, since a size of the groove 231 is determined within a range of a size of the flange portion 230, an advantage of easily managing a size of a product according to processing of the groove 231 is present. The groove 231 is a part into which the protrusion 310 of the magnet 300 is inserted. When the yoke 200 is seen throughout, the groove 231 is located at an end of the yoke 200.

The yoke 200 may be manufactured, without using an aluminum material, by using a general metal material through a deep drawing process and a bending process. Accordingly, in manufacturing the yoke 200, an advantage of drastically reducing manufacturing costs by reducing a material cost and increasing productivity is present.

Figure 8:
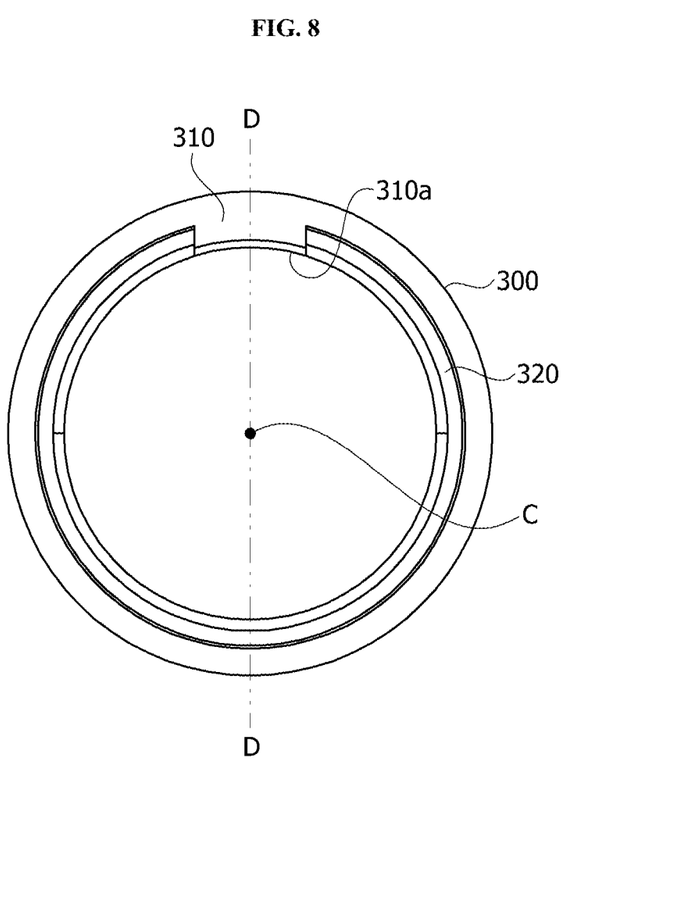
FIG. 8 is a view illustrating a magnet.
Figure 9:
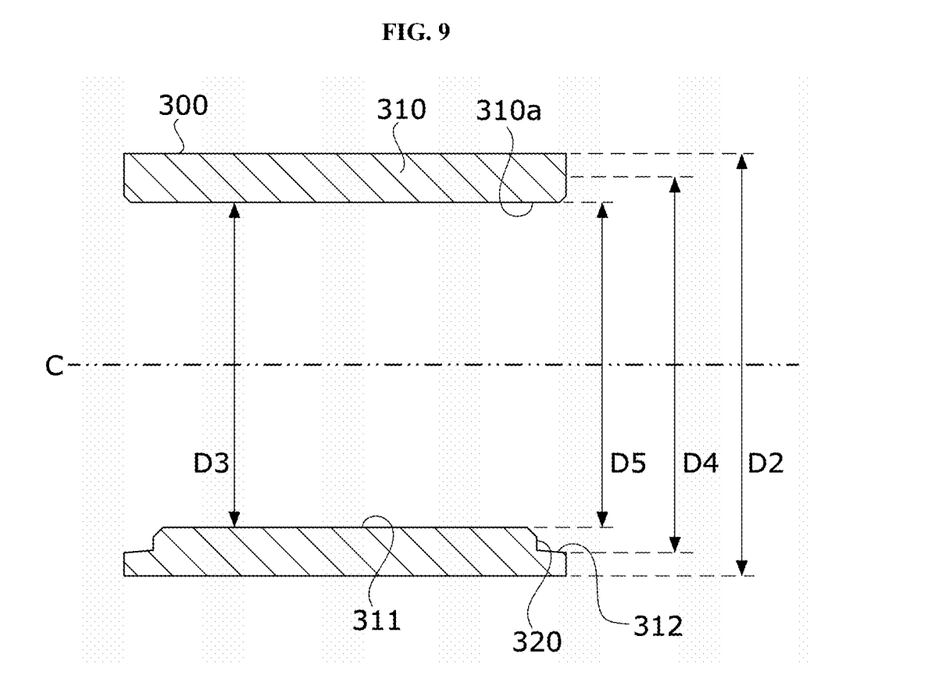
FIG. 9 is a cross-sectional view of the magnet taken along a line D-D of FIG. 8.
Figure 10:
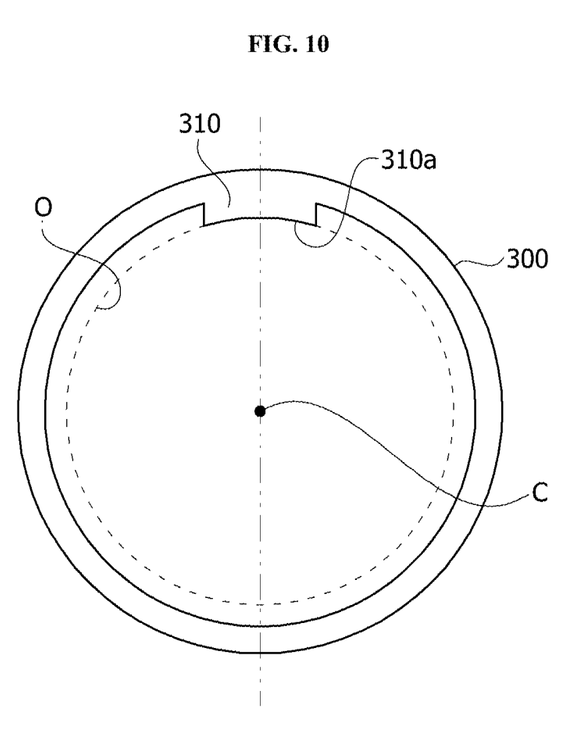
FIG. 10 is a view illustrating a position of an inner circumferential surface of a protrusion.

FIG. 8 is a view illustrating the magnet, FIG. 9 is a cross-sectional view of the magnet taken along a line D-D of FIG. 8, and FIG. 10 is a view illustrating a position of an inner circumferential surface of the protrusion.

The flange portion 230 of the yoke 200 may be combined with an end of the magnet 300. Also, an outer diameter D1 (refer to FIG. 7) of the flange portion 230 may be at least smaller than an outer diameter D2 of the magnet 300. The magnet 300 may include a first inner circumferential surface 311 and a second inner circumferential surface 312. A diameter D5 of the first inner circumferential surface 311 is smaller than a diameter D4 of the second inner circumferential surface 312. The outer diameter D1 (refer to FIG. 7) of the flange portion 230 is greater than the diameter D5 of the first inner circumferential surface 311 and is smaller than the diameter D4 of the second inner circumferential surface 312. The diameter D5 of the first inner circumferential surface 311 corresponds to an inner diameter D3 of the magnet 300.

Referring to FIGS. 8 to 10, the magnet 300 may include the protrusion 310 and a step portion 320.

In the magnet 300, the step portion 320 may be disposed. The protrusion 310 may protrude from the step portion 320. Otherwise, the protrusion 310 may correspond to an area of the end of the magnet 300 on which the step portion 320 is not formed. The step portion 320 is disposed between the first inner circumferential surface 311 and the second inner circumferential surface 312. The flange portion 230 of the yoke 200 may be mounted on the step portion 320. Also, the flange portion 230 comes into contact with the second inner circumferential surface 312. The outer diameter D1 (refer to FIG. 7) of the flange portion 230 may be formed to be smaller than the diameter D4 of the second inner circumferential surface 312.

When the protrusion 310 protrudes from the step portion 320, a shortest distance between a fore end of the protrusion 310 to a center C of the magnet 300 is formed to be greater than the inner radius D3/2 of the magnet 300. For example, an inner circumferential surface 310a of the protrusion 310 may be disposed to be flush with the first inner circumferential surface 311 to be successive together. That is, as shown in FIG. 10, the first inner circumferential surface 311 is located on a virtual circle 0 located along the inner circumferential surface 310a of the protrusion 310.

This is a configuration for preventing the protrusion 310 from being held by the body portion 210 of the yoke 200. Meanwhile, an end of the protrusion 310 may be a curve.

The protrusion 310 is located at the end of the magnet 300 when the magnet 300 is seen throughout. Accordingly, in embodying a combination configuration, advantages of easily processing the magnet 300 and a simple manufacturing process are present.

As described above, the rotor, the motor, and the actuator including the same according to one exemplary embodiment of the present invention have been described in detail with reference to the attached drawings.

The above description is merely for exemplarily describing the technical concept of the present invention, and a variety of modifications, changes, and replacements thereof may be made by one of ordinary skill in the art without departing from the essential features of the present invention. Accordingly, the embodiments disclosed herein and the attached drawings are not intended to limit but merely explain the technical concept of the present invention, and the scope of the present invention should not be limited by the above embodiments and the attached drawings. The scope of the present invention should be interpreted by the following claims and all technical concepts within the equivalent scope thereof should be interpreted as being included in the scope of the present invention.

DESCRIPTION OF REFERENCE NUMERALS

1: motor, 2: moving portion, 3: control portion, 10: rotor, 20: stator, 100: rotating shaft, 200: yoke, 210: body portion, 220: combination portion, 230: flange portion, 231: groove, 300: magnet, 310: protrusion.

The invention claimed is:

1. A motor comprising:
a rotating shaft;
a rotor provided outside of the rotating shaft;
a stator provided outside of the rotor,
wherein the rotor includes a yoke and a magnet provided outside of the yoke,
wherein the magnet includes a first inner circumferential surface and a second inner circumferential surface, and a step portion is provided between the first inner circumferential surface and the second inner circumferential surface, the magnet extends in an axial direction from a first axial end to a second axial end, and the second inner circumferential surface is at the second axial end of the magnet, wherein an inner diameter of the second inner circumferential surface at the second axial end of the magnet is greater than an inner diameter of the first inner circumferential surface, wherein the yoke includes a body portion provided to be spaced apart from the rotating shaft, a combination portion and a flange portion, the yoke extends in the axial direction from a first axial end to a second axial end, the combination portion is provided at the first axial end of the yoke and at a first side of the body portion and on which the rotating shaft is pressed and fitted thereon, and the flange portion is provided at the second axial end of the yoke and at a second side of the body portion, wherein a diameter of the second inner circumferential surface is greater than a diameter of the first inner circumferential surface, and wherein the flange portion includes a groove, wherein the magnet includes a protrusion protruding from the second inner circumferential surface at the second axial end of the magnet, and the protrusion is formed only at the second axial end of the magnet, and wherein the flange portion at the second axial end of the yoke is in contact with the step portion, and the protrusion of the magnet is provided in the groove of the flange portion at the second axial end of the yoke.

2. The motor of claim 1, wherein the groove is partially cut inward from an outer edge of the flange portion.

3. The motor of claim 2, wherein an outer diameter of the flange portion is smaller than an outer diameter of the magnet.

4. The motor of claim 1, wherein the flange portion comes into contact with the second inner circumferential surface at the second axial end of the magnet.

5. The motor of claim 4, wherein an outer diameter of the flange portion is greater than an inner diameter of the first inner circumferential surface of the magnet and is equal to or smaller than an inner diameter of the second inner circumferential surface at the second axial end of the magnet.

6. The motor of claim 1, wherein the protrusion includes an inner circumferential surface.

7. The motor of claim 6, wherein the inner circumferential surface of the protrusion is provided to be flush with the first inner circumferential surface of the magnet to be successive thereto.

8. The motor of claim 1, wherein a shortest distance from a fore end of the protrusion to a center of the magnet is formed to be greater than an inner radius of the magnet.

* * * * *